(12) United States Patent
Gunji et al.

(10) Patent No.: US 9,092,118 B2
(45) Date of Patent: Jul. 28, 2015

(54) DISPLAY CONTROLLER, DISPLAY CONTROL METHOD, AND COMPUTER-READABLE STORAGE MEDIUM

(75) Inventors: Daisuke Gunji, Tokyo (JP); Tomonobu Hiraishi, Tokyo (JP); Chieko Ito, Nagoya (JP)

(73) Assignee: CANON KABUSHIKI KAISHA (JP)

( * ) Notice: Subject to any disclaimer, the term of this patent is extended or adjusted under 35 U.S.C. 154(b) by 175 days.

(21) Appl. No.: 13/395,665

(22) PCT Filed: Feb. 21, 2011

(86) PCT No.: PCT/JP2011/054418
§ 371 (c)(1),
(2), (4) Date: Mar. 13, 2012

(87) PCT Pub. No.: WO2011/111552
PCT Pub. Date: Sep. 15, 2011

(65) Prior Publication Data
US 2012/0176385 A1   Jul. 12, 2012

(30) Foreign Application Priority Data

Mar. 10, 2010 (JP) .................................. 2010-053142

(51) Int. Cl.
*G06F 3/0483* (2013.01)

(52) U.S. Cl.
CPC .......... *G06F 3/0483* (2013.01); *G09G 2380/14* (2013.01)

(58) Field of Classification Search
CPC ............ G09G 2380/14; G06F 3/04842; G06F 3/04845; G06F 3/0483
USPC .......................... 345/156, 157, 173–178, 901; 178/18.01–20.04
See application file for complete search history.

(56) References Cited

U.S. PATENT DOCUMENTS

| | | | | |
|---|---|---|---|---|
| 5,463,725 | A * | 10/1995 | Henckel et al. | 715/776 |
| 5,909,207 | A * | 6/1999 | Ho | 345/156 |
| 6,924,822 | B2 * | 8/2005 | Card et al. | 345/660 |

(Continued)

FOREIGN PATENT DOCUMENTS

| | | |
|---|---|---|
| CN | 1688962 A | 10/2005 |
| CN | 1818904 A | 8/2006 |

(Continued)

OTHER PUBLICATIONS

International Search Report (ISR) issued May 24, 2011 for parent PCT/JP2011/054418.

(Continued)

*Primary Examiner* — Ilana Spar
(74) *Attorney, Agent, or Firm* — Rossi, Kimms & McDowell LLP

(57) ABSTRACT

A display controller which displays an electronic book and enables a user to perform intuitive operations when switching between pages to be displayed. A CPU detects a cursor position on the most frontally-displayed one of a plurality of pages in response to a user operation. Further, the CPU extracts respective areas of shapes dependent on the detected cursor position, from an image representing the most frontally-displayed page and an image representing a reverse page with respect to the most frontally-displayed page. Then, the CPU draws the extracted areas on the screen.

8 Claims, 21 Drawing Sheets

(56) References Cited

U.S. PATENT DOCUMENTS

| | | |
|---|---|---|
| 6,989,815 B2 * | 1/2006 | Liang et al. .................... 345/156 |
| 2003/0048251 A1 | 3/2003 | Liang et al. |
| 2004/0138952 A1 | 7/2004 | Seet et al. |
| 2006/0176307 A1 | 8/2006 | Lagercrantz |
| 2009/0066701 A1 | 3/2009 | Kao et al. |

FOREIGN PATENT DOCUMENTS

| | | | |
|---|---|---|---|
| JP | 05-011965 A | 1/1993 | |
| JP | 08106469 A | 4/1996 | |
| JP | 2004104360 A | 4/2004 | |
| JP | 2005521154 A | 7/2005 | |
| JP | 2007-058653 A | 3/2007 | |

OTHER PUBLICATIONS

"Web Designing" vol. 97, No. 8, p. 64, Mainichi Communications, Inc. Aug. 1, 2009.
Japanese Office Action cited in Japanese counterpart application No. JP2010-053142, dated Feb. 25, 2014.
Official Action issued in CN201180013211.3 mailed Aug. 5, 2014. English translation provided.

* cited by examiner

DISPLAY CONTROLLER, DISPLAY CONTROL METHOD, AND COMPUTER-READABLE STORAGE MEDIUM

This application is a U.S. National Phase Application of PCT International Application PCT/JP2011/054418 filed on Feb. 21, 2011 which is based on and claims priority from JP 2010-053142 filed on Mar. 10, 2010 the contents of which is incorporated herein in its entirety by reference.

TECHNICAL FIELD

The present invention relates to a display controller for use in displaying an electronic book having a plurality of pages, a display control method, and a computer-readable storage medium storing a program for causing a computer to execute the display control method.

BACKGROUND ART

It is a general practice to display an electronic book on a display device using an information processing apparatus, such as a personal computer. In displaying the electronic book, pages for display are switched in response to a user operation.

By the way, in an actual book, the user sometimes changes a page which the user catches or the amount of hold of pages to thereby only partially turn the page for partially checking contents on the reverse side of the page or contents of a page before or after the page.

Further, the user sometimes checks the outline of contents of pages before or after the page being read by turning over a considerable amount of pages. Further, the user sometimes turns over a large amount of pages at a time to view a target page without checking contents of pages turned over before the target page is reached.

In the conventional electronic book, however, the switching of pages is instructed by pressing a predetermined button, and hence operations for turning pages are different from those performed when reading the actual book. This makes it impossible for the user to perform intuitive operations, which is not userfriendly.

SUMMARY OF INVENTION

Technical Problem

The present invention provides a display controller which displays an electronic book and enables a user to perform intuitive operations when switching between pages to be displayed, a display control method, and a computer-readable storage medium storing a program for causing a computer to execute the display control method.

Solution of Problem

Accordingly, in a first aspect of the present invention, there is provided a display controller that controls display of an electronic book including a plurality of pages on a screen, comprising a detection unit configured to detect a position of a cursor on a most frontally-displayed page of the plurality of pages, in response to a user operation, an extraction unit configured to extract respective areas of shapes dependent on the detected position of the cursor, from an image representing the most frontally-displayed page and an image representing a reverse page with respect to the most frontally-displayed page, respectively, and a drawing unit configured to draw the extracted areas on the screen.

Accordingly, in a second aspect of the present invention, there is provided a method of controlling display of an electronic book including a plurality of pages on a screen, comprising detecting a position of a cursor on a most frontally-displayed page of the plurality of pages, in response to a user operation, extracting respective areas of shapes dependent on the detected position of the cursor, from an image representing the most frontally-displayed page and an image representing a reverse page with respect to the most frontally-displayed page, respectively, and drawing the extracted areas on the screen.

Accordingly, in a third aspect of the present invention, there is provided a non-transitory computer-readable storage medium storing a program for causing a computer to execute a method of controlling display of an electronic book including a plurality of pages on a screen, wherein the method comprises detecting a position of a cursor on a most frontally-displayed page of the plurality of pages, in response to a user operation, extracting respective areas of shapes dependent on the detected position of the cursor, from an image representing the most frontally-displayed page and an image representing a reverse page with respect to the most frontally-displayed page, respectively, and drawing the extracted areas on the screen.

Advantageous Effects of Invention

Further features of the present invention will become apparent from the following description of exemplary embodiments with reference to the attached drawings.

DESCRIPTION OF EMBODIMENTS

The present invention will now be described in detail below with reference to the accompanying drawings showing embodiments thereof.

Figure 1:
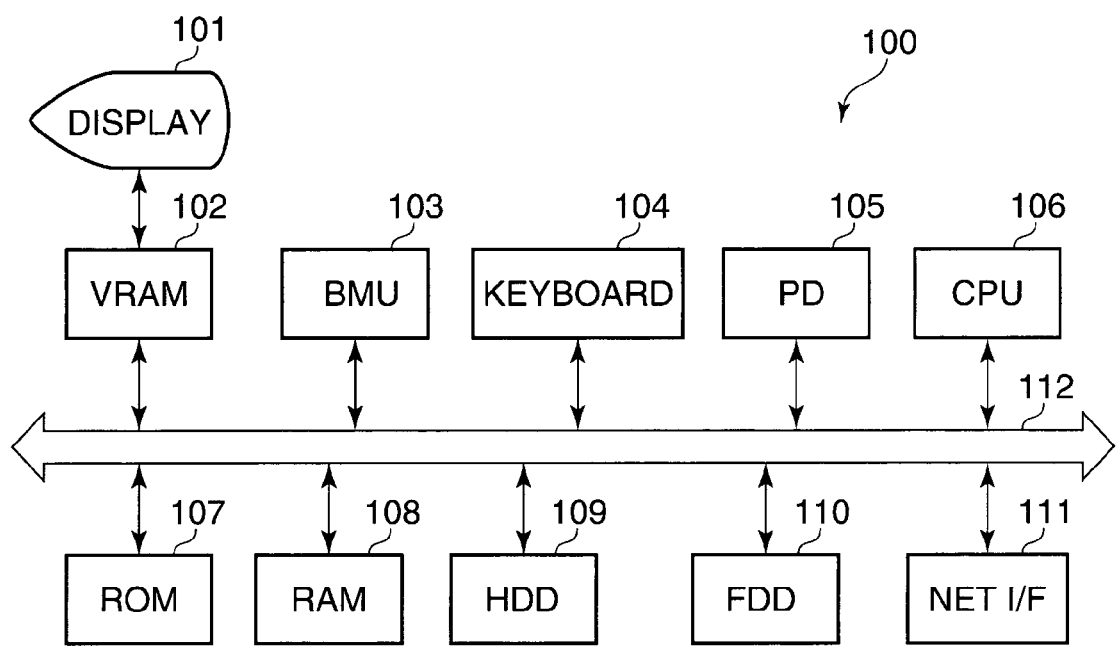
FIG. 1 A block diagram of an information processing apparatus including a display controller according to a first embodiment of the present invention.

FIG. 1 is a block diagram of an information processing apparatus 100 including a display controller according to a first embodiment of the present invention.

Referring to FIG. 1, the illustrated information processing apparatus 100 is a personal computer, for example. This information processing apparatus 100 includes a display 101. Further, the information processing apparatus 100 includes a video random access memory (VRAM) 102 and a bit move unit (BMU) 103. Furthermore, the information processing apparatus 100 includes a keyboard 104 and a pointing device (PD) 105. Further, the information processing apparatus 100 includes a CPU 106, a ROM 107, a RAM 108, a hard disk drive (HDD) 109, an flexible disk drive (FDD) 110, and a network interface (NET I/F) 111. These component elements are connected to each other by a CPU bus 112.

The display 101 displays documents, graphics, and images, which are being edited, other edit information, icons, messages, menus, and user interface information.

Image data to be displayed on the display 101 is rendered (i.e. stored) in the VRAM 102. The image data rendered in the VRAM 102 is transferred to the display 101 according to a predetermined procedure, whereby an image is displayed on the display 101.

The bit move unit 103 controls data transfer between memories (between the VRAM 102 and the other memories, in the illustrated example), and data transfer between the memories and an input/output (I/O) device (e.g. the network interface 111), for example.

The keyboard 104 is an input device including various kinds of keys for use in inputting documents and the like. The pointing device 105 is a mouse, for example, and is used for designating a selected one of icons, menu options, and like other objects of contents or for dragging and dropping a selected one of objects displayed on the display 101. Although in the present embodiment, the position of a cursor is designated using the pointing device 105, assuming that the display 101 is implemented by a touch panel and the user designates the position of a cursor by touching the display 101 e.g. with a finger, the present embodiment can be similarly achieved as well.

The CPU 106 controls the devices based on control programs stored in the ROM 107, the HDD 109, or a flexible disk (not shown). The ROM 107 stores various kinds of control programs and data.

The RAM 108 has a work area for the CPU 106, a data save area for use in error processing, a load area for control programs, and so forth. The HDD 109 stores various kinds of control programs executed by the information processing apparatus 100, contents, and data, in a hard disk thereof.

The flexible disk drive 110 controls access to the flexible disk typified by a floppy (registered trademark) disk (FD), or the like.

The network interface 111 communicates with other information processing apparatuses, printers, and the like, via a network. The CPU bus 112 includes an address bus, a data bus, and a control bus.

The control programs can also be provided to the CPU 106 from the ROM 107, the HDD 109, and the FDD 110. Further, the control programs can be provided to the CPU 106 from other information processing apparatuses through the network interface 111 via the network.

In the illustrated information processing apparatus 100, the CPU 106 reads out an electronic book in the form of electronic book data, stored e.g. in the hard disk. Then, the CPU 106 displays two pages of the electronic book forming a spread (hereinafter referred to as the "double-page spread") out of a plurality of pages forming the electronic book, on the display 101.

Figure 2:
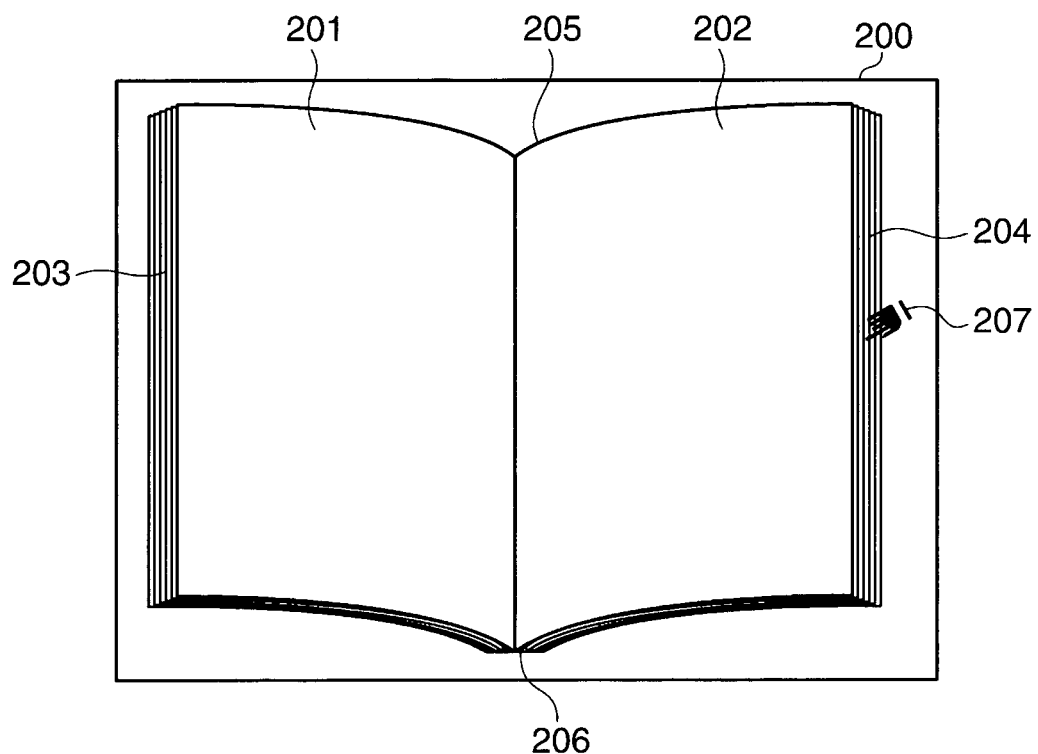
FIG. 2 A view of an example of a double-page spread of an electronic book displayed on a display of the information processing apparatus shown in FIG. 1.

FIG. 2 is a view of an example of the double-page spread of an electronic book displayed on the 101 display of the information processing apparatus 100 shown in FIG. 1.

As shown in FIG. 2, in a display region 200 of the display 101, an image in the form of a book is displayed in which pages 201 and 202 are displayed, together with and fore edges 203 and 204 on the respective left and right sides of the two pages 201 and 202. Further, a top edge 205 and a bottom edge 206 are displayed on the respective upper and lower sides of the double-page spread of the two pages 201 and 202. Further, a cursor 207 capable of designating a desired point in the display region 200 is also displayed in the display region 200.

Although not shown in FIG. 2, images and characters of the left page of the double-page spread are displayed in layout on the page 201. Similarly, images and characters of the right page of the double-page spread are displayed in layout on the page 202.

The fore edge 203 represents a thickness corresponding to the number of pages from a front cover to the right page of the double-page spread. Similarly, the fore edge 204 represents a thickness corresponding to the number of pages from the left page of the double-page spread to a back cover (also referred to as a reverse cover).

The top edge 205 and the bottom edge 206 also represent the thicknesses corresponding to the numbers of the pages, similarly to the fore edges 203 and 204.

The cursor 207 is capable of moving on desired places in the display region 200 according to instructions from the pointing device 105 described above with reference to FIG. 1.

Although in the illustrated example, the description is given assuming that when the turning of pages of the electronic book is performed from right to left, the pages are turned in the forward direction, the page turning direction does not limit the present invention.

Figure 3:
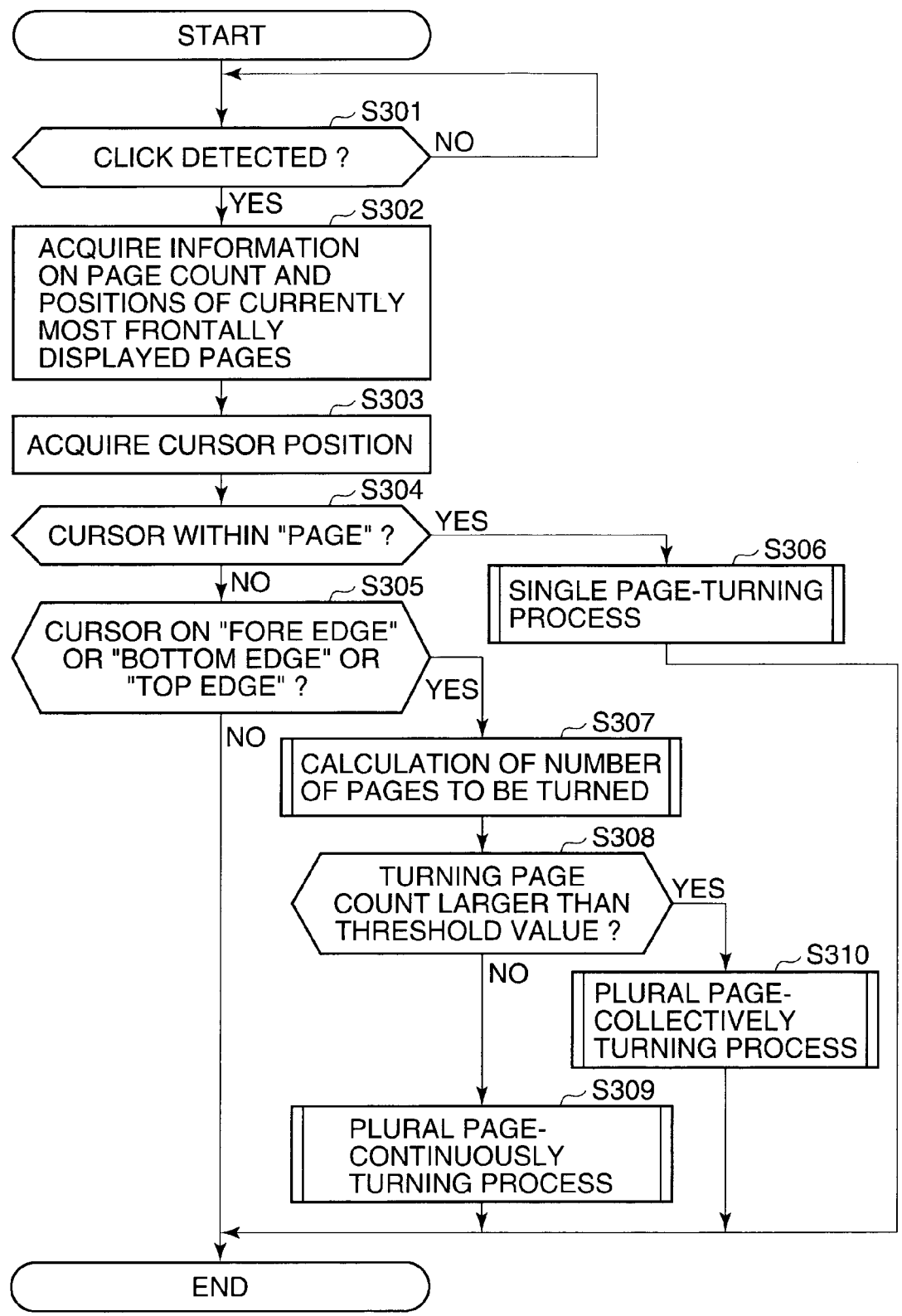
FIG. 3 A flowchart of a page turning process executed by the information processing apparatus shown in FIG. 1.

Next, a description will be given of an example of an operation of the information processing apparatus 100 for displaying pages of the electronic book being subjected to a turning operation. FIG. 3 is a flowchart of a page turning process executed by the information processing apparatus shown in FIG. 1.

Referring to FIGS. 1 to 3, when the page turning process is started, the CPU 106 determines whether or not a click instruction (a predetermined operation on the cursor) has been given using the pointing device 105 in the display region 200 (step S301). If no click instruction has been given (NO to S301), the CPU 106 determines that the user is reading the pages displayed, and does not change the display of the display region 200. The CPU 106 awaits input from the user.

On the other hand, if a click instruction has been given (YES to S301), the CPU 106 senses the click operation, and acquires page count information indicative of the number of all the pages of the electronic book and current page position information indicative of the positions of pages currently most frontally displayed when the click instruction has been received therefrom (step S302).

In the above-described step S301, even during execution of the page turning process, a desired input instruction is accepted which instructs a page operation other than an additional page turning operation in the direction in which pages are being turned.

Subsequently, the CPU 106 acquires position information on the cursor 207 as the position of the cursor (hereinafter referred to as the "cursor position") (step S303). Then, the CPU 106 determines whether or not the cursor position overlaps any of the respective areas of the pages 201 and 202 (step S304). In other words, the CPU 106 determines whether or not a page display region of the displayed book and the cursor position overlap each other. Here, an area showing the entire electronic book is referred to as a "book display region", and an area showing only pages of the electronic book is referred to as the "page display region".

If the CPU 106 determines that the page display region and the cursor position do not overlap each other (NO to S304), the CPU 106 determines whether or not the cursor position overlaps any of the respective areas of the fore edges 203 and 204 and the respective areas of the top edge 205 and the bottom edge 206 (step S305). That is, the CPU 106 determines whether or not the cursor position is at any of the edges of the book display region.

If the CPU 106 determines that the cursor position does not overlap any the areas of the fore edges 203 and 204 and the areas of the top edge 205 and the bottom edge 206 (NO to S305), the CPU 106 determines that a position outside the book display region has been clicked, followed by terminating the present process without performing any of specific page turning processes described hereinafter.

In the step S304, if the CPU 106 determines that the page display region and the cursor position overlap each other (YES to S304), the CPU 106 executes a single page-turning process (step S306). The single page-turning process is defined as a process for turning a single page and an associated reverse page forward or backward.

Figure 4:
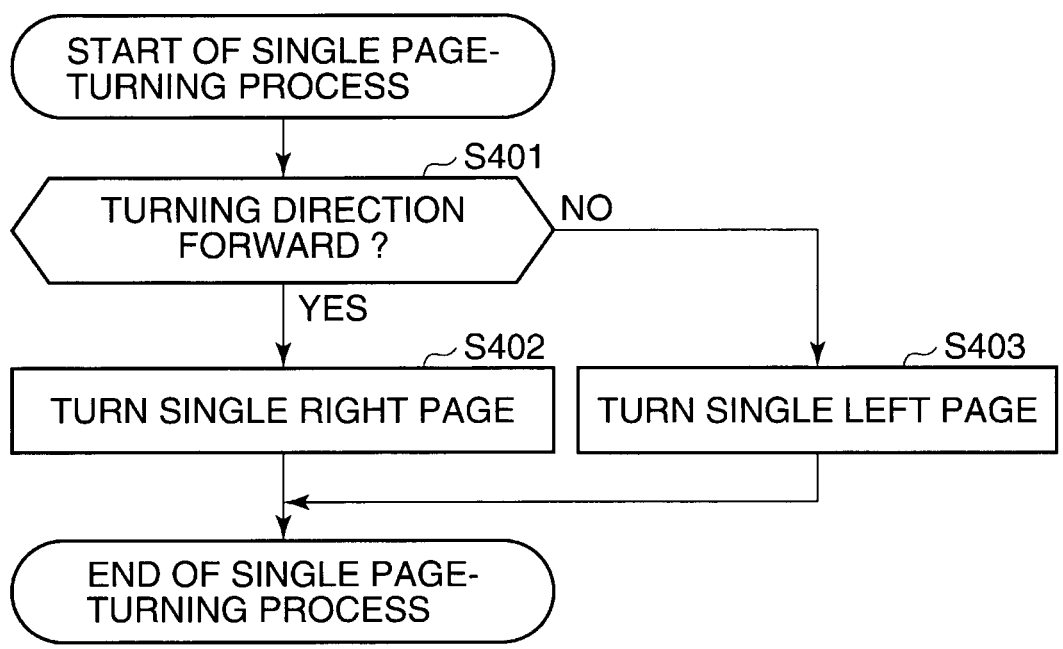
FIG. 4 A flowchart of a single page-turning process executed in a step in the page turning process shown in FIG. 3.

FIG. 4 is a flowchart of the single page-turning process executed in the step S306 in FIG. 3.

Referring to FIGS. 1, 2, and 4, when the single page-turning process is started, the CPU 106 determines whether or not the page turning direction is the forward direction (i.e. a direction in which the respective page numbers of displayed pages come to be increased) (step S401). Here, the CPU 106 determines that the page turning direction is the backward direction if the cursor position is on the left page 201 in the page display region, whereas it determines the page turning direction is the forward direction if the cursor position is on the right page 202. If the CPU 106 determines that the page turning direction is the forward direction (YES to S401), the CPU 106 turns the most frontally-displayed right page in the book display region whereby the next two pages are displayed in a double-page spread (step S402). Then, the CPU 106 terminates the single page-turning process.

Figure 5:
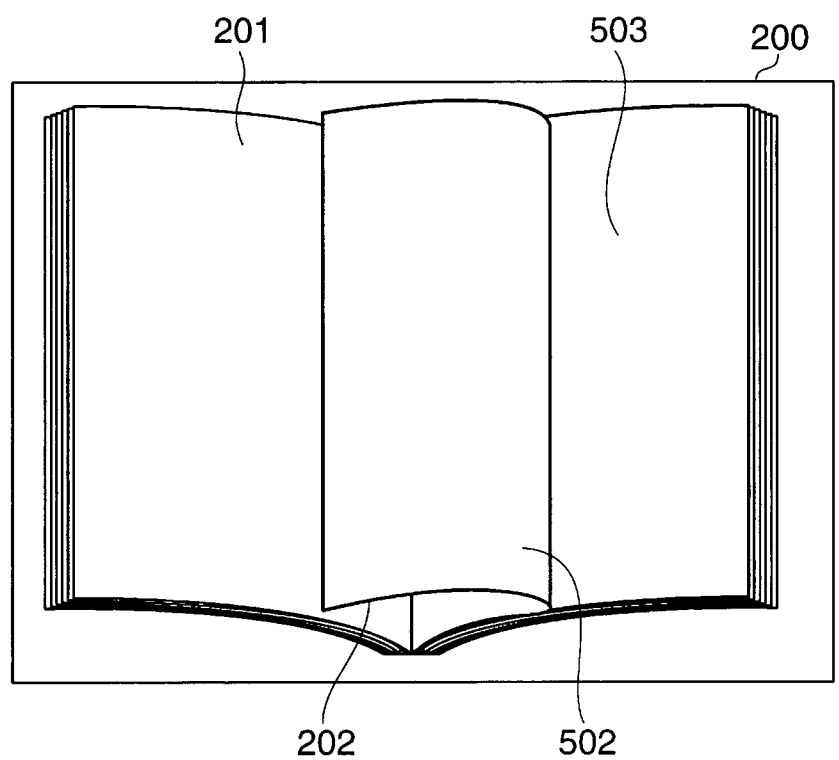
FIG. 5 A view of an example of a page display showing a state in which a single right page and an associated reverse page are turned in a display region appearing in FIG. 2.

FIG. 5 is a view of an example of a page display showing a state in which the most frontally-displayed right page and an associated reverse page are turned in the display region appearing in FIG. 2. As shown in FIG. 5, when this operation of turning a right page is executed, there is displayed a state in which the right page denoted by 202 and an associated reverse page 502 are turned and moved to the left page 201. At this time, the associated reverse page 502 comes to be viewed, and further a page 503 under the right page 202 also comes to be viewed.

More specifically, since the turning process is performed while displaying the contents of the page 202 and the associated reverse page 502 being turned, it is possible to give the user a feeling that the page is being turned.

If the next page is the back cover, the CPU 106 does not execute the page turning process. Alternatively, the CPU 106 may display an operation of closing the back cover. Anyway, the difference therebetween is only difference between detailed manners of the display process, which does not limit the present invention.

Referring again to FIG. 4, if the CPU 106 determines that the page turning direction is not the forward direction (NO to S401), the CPU 106 turns the most frontally-displayed left page whereby the preceding two pages are displayed in a double-page spread (step S403), followed by terminating the single page-turning process. Although not shown, in the step S403, the single page turning is performed in a direction opposite to the direction described with reference to FIG. 5.

In this case as well, when the preceding page is the front cover, the CPU 106 does not execute the page turning process, similarly to the case of the next page being the back cover. Alternatively, the CPU 106 may display closing of the front cover. Anyway, the difference therebetween is only difference between the detailed manners of the display process, which does not limit the present invention.

Referring back to FIG. 3, if the CPU 106 determines in the step S305 that the cursor position overlaps any of the areas of the fore edges 203 and 204 and the top edge 205 and the bottom edge 206 (YES to S305), the CPU 106 calculates the number of pages to be turned forward or backward, based on the cursor position (step S307).

Figure 6:
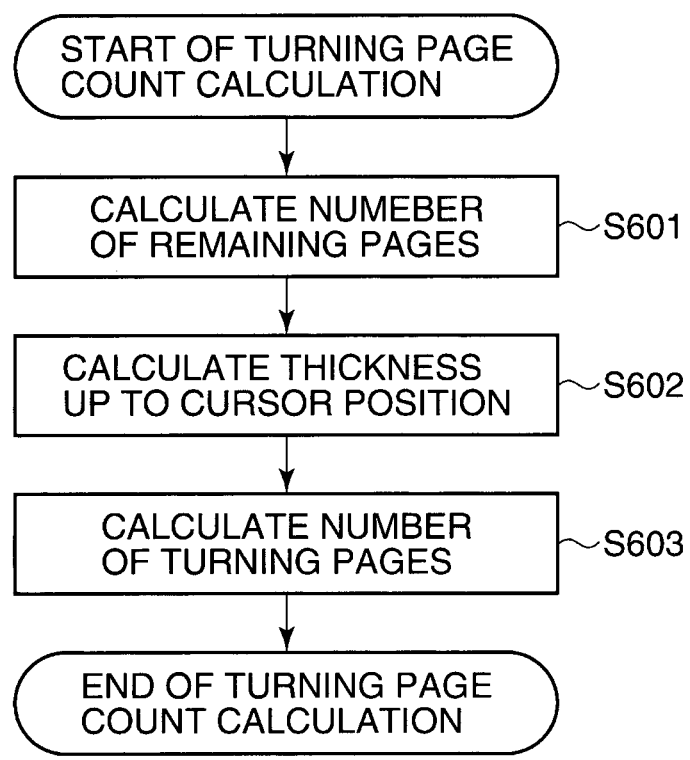
FIG. 6 A is a flowchart of a turning page count calculation process executed in a step in the page turning process shown in FIG. 3.
Figure 7:
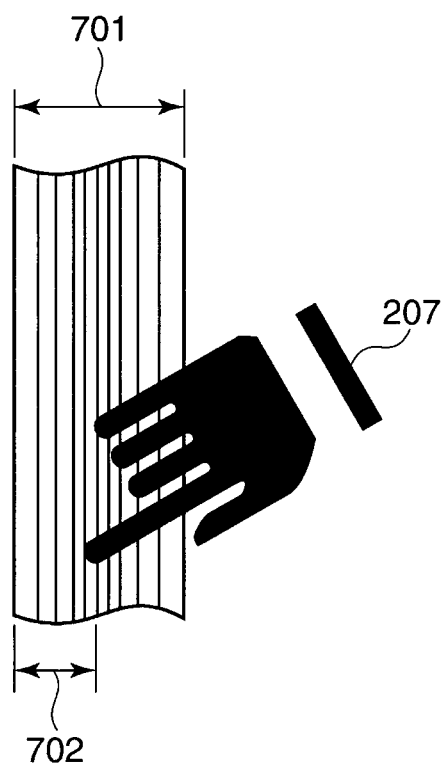
FIG. 7 A view of an example of a display showing a thickness of turning pages acquired as a result of the turning page count calculation process described with reference to FIG. 6.

FIG. 6 is a flowchart of a turning page count calculation process executed in the step S307 in FIG. 3. Further, FIG. 7 is a view of an example of a display showing a thickness of turning pages acquired as a result of the turning page count calculation process described with reference to FIG. 6.

Referring to FIGS. 1, 2 and 6, a case will be described here, by way of example, in which the fore edge 204 on the right side of the book display region has been clicked. Also when the left-side fore edge 203, the left or right side of the top edge 205, or the left or right side of the bottom edge 206 has been clicked, the number of turning pages can be calculated in the same manner.

When the turning page count calculation process is started, the CPU 106 calculates the actual number of remaining pages from the most frontally-displayed right page to the back cover based on the number of pages and the current page position information acquired in the step S302 shown in FIG. 3 (step S601).

Here, the actual number of the remaining pages is represented by a remaining page count L. In FIG. 7, the thickness of the remaining page count L is denoted by 701, and the thickness 701 displayed on the screen is represented by M. Similarly, also when the right side of the top edge 205 or the bottom edge 206 has been clicked, it is possible to calculate the actual remaining page count L and the displayed thickness M.

Further, when the left-side fore edge 203 or the left side of the top edge 205 or the bottom edge 206 has been clicked, the CPU 106 calculates the number of pages from the most frontally-displayed left page to the front cover based on the number of pages and the current page position information acquired in the step S302 shown in FIG. 3. Here, the number of the pages is represented by the page count L, and the thickness displayed on the screen is represented by M, similarly to the above-described case.

Subsequently, the CPU 106 calculates a thickness N denoted by 702 in FIG. 7 based on the cursor position information acquired in the step S303 shown in FIG. 3. When the right side of the top edge 205 or the bottom edge 206, the left-side fore edge 203, or the left side of the top edge 205 or the bottom edge 206 has been clicked as well, the thickness N from one of the most frontally-displayed pages, on a side corresponding to the cursor position, to the cursor position is calculated (step S602).

Next, the CPU 106 calculates the number of turning pages using an equation (1) based on the page count L, the thickness M, and the thickness N, mentioned above (step S603). Then, the CPU 106 terminates the turning page count calculation process.

$$\text{turning page count} = L \times N / M \tag{1}$$

If the turning page count is an odd number, it is set to an even number smaller than the odd number by 1. If the turning page is not divisible, the turning page count is set to an even number closest to a value calculated by the above equation (1). The method of calculating the turning page count as an even number, as mentioned above, does not limit the present invention.

Referring again to FIG. 3, the CPU 106 compares the turning page count acquired in the step S307 and a predetermined threshold value to thereby determine whether or not the turning page count is larger than the threshold value (step S308). If the turning page count is not larger than the threshold value (NO to S308), the CPU 106 executes a plural page-continuously turning process (step S309). In the plural page-continuously turning process, a plurality of pages are sequentially and continuously turned.

On the other hand, if it is determined in the step S308 that the turning page count is larger than the threshold value (YES to S308), the CPU 106 executes a plural page-collectively turning process (step S310). In the plural page-collectively turning process, a plurality of pages are collectively and automatically turned.

By the way, the above-mentioned threshold value is the number of pages, which or a number larger than which is considered to give humans a more intuitive feeling when the pages are collectively turned to a target page or its vicinity without displaying each page being turned than when they are sequentially turned while displaying each page being turned. This threshold value is set and stored in advance in the information processing apparatus 100. The threshold value may be calculated on a book-by-book basis according to the number of pages of the whole book.

Figure 8:
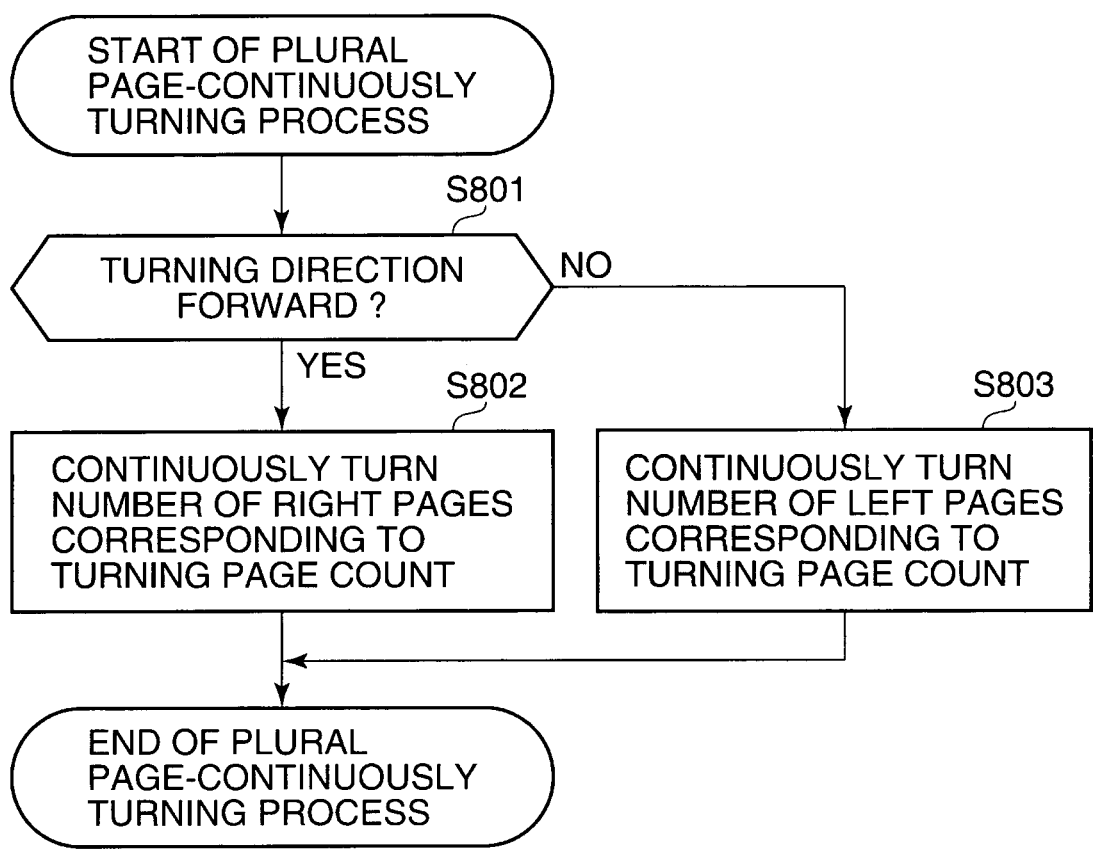
FIG. 8 A flowchart of a plural page-continuously turning process executed in a step in the page turning process shown in FIG. 3.

FIG. 8 is a flowchart of the plural page-continuously turning process executed in the step S309 shown in FIG. 3.

Referring to FIGS. 1, 2, and 8, a description will be given of a case where the fore edge 203 or 204 displayed in the book display region has been clicked. The plural page-continuously turning process is carried out in the same manner also when the left or right side of the top edge 205 or the bottom edge 206 has been clicked.

When the plural page-continuously turning process is started, the CPU 106 determines whether or not the turning direction is the forward direction (step S801). In the present example, if the cursor position acquired in the step S303 in FIG. 3 is on the left-side fore edge 203, the CPU 106 determines that the page turning direction is the backward direction, and if the cursor position is on the right-side fore edge 204, it determines that the page turning direction is the forward direction.

If the CPU 106 determines that the page turning direction is the forward direction (YES to S801), the CPU 106 continuously turns a number of pages on the right side, the number corresponding to the turning page count calculated in the step S307 in FIG. 3, and displays two pages consisting of the last page of the group of the number of pages and a page immediately following the last page in a double-page spread (step S802).

Figure 9:
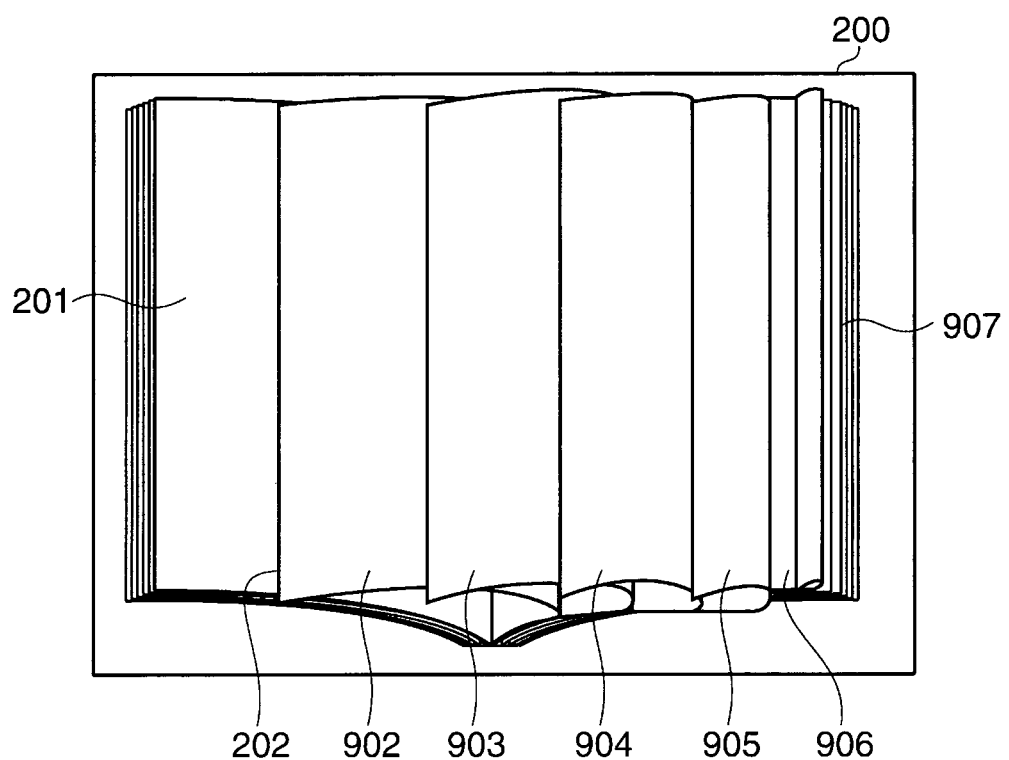
FIG. 9 A view of an example of a display showing a state in which five right pages and respective associated reverse pages are continuously turned in the plural page-continuously turning process described with reference to FIG. 8.

FIG. 9 is a view of an example of a display showing a state in which five right pages and respective associated reverse pages are continuously turned in the plural page-continuously turning process described with reference to FIG. 8

As shown in FIG. 9, when the plural page-continuously turning process is performed on five pages (and respective associated reverse pages), there is shown a state in which the five pages (906 denotes one of them) and respective associated reverse pages (902, 903, 904, and 905 denote four of them) on the right-page side are continuously turned and moved to the left-page side. More specifically, in the plural page-continuously turning process, when a page group of a predetermined number of pages are turned, as shown in FIG. 9, rectangular images which have respective predetermined widths from associated fore-edge sides of the respective reverse pages are extracted from respective images representative of whole reverse pages starting from the first reverse page of the page group, and are arranged side by side for display. Adjacent to the right of the rectangular images, there is displayed an image representative of a portion of a last-but-one page of the page group such that the portion has a predetermined width from a fore-edge side. After that, a reverse page which is the last page of the page group is displayed on the left-page side, and a page 907 next to the page group, which is to be frontally displayed, is displayed on the right-page side, followed by terminating the plural page-continuously turning process. In FIG. 9, 902 denotes the reverse page with respect to the page 202 shown in FIG. 2. Further, the predetermined width from the fore-edge side may be a fixed value, or may be determined according to the number of pages to be continuously turned. Further, although it has been described that rectangular images are extracted, the shapes of the rectangular images may include curves, not straight lines, or may be replaced by other polygons having different shapes. This makes it possible to represent a page turning operation with images in a manner more similar to an actual operation of turning pages of an actual book.

In this case, the page turning process is performed while displaying the contents of the five pages 902, 903, 904, 905, and 906 that are being turned. As a consequence, it is possible to give the user a feeling that the pages are continuously turned.

Referring again to FIG. 8, if the CPU 106 determines in the step S801 that the page turning direction is not the forward direction (NO to S801), the CPU 106 continuously turns a number of pages on the left side, the number corresponding to the turning page count calculated in the step S307 in FIG. 3, and displays two pages consisting of the last page of the group of the number of pages and a page immediately preceding the last page in a double-page spread (step S803).

Although not shown, in the step S803, the plural page-continuously turning process is performed in a direction opposite to the direction described with reference to FIG. 9.

Figure 10:
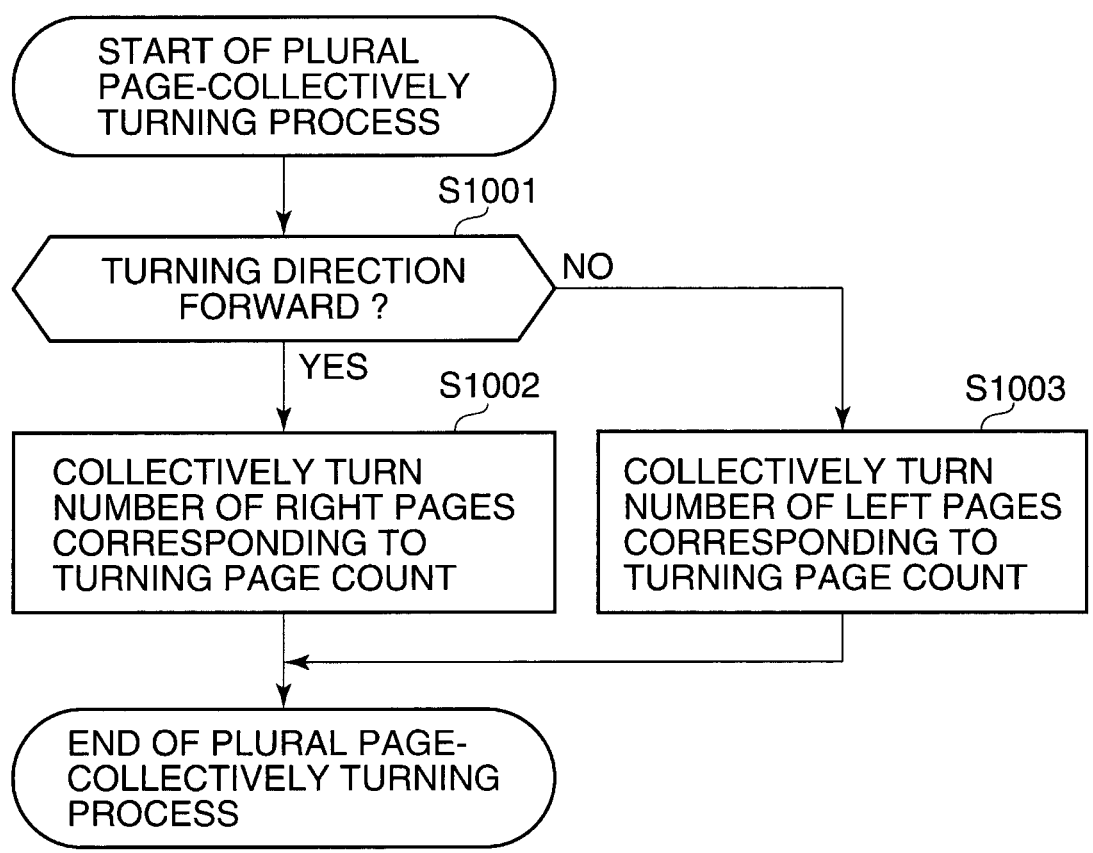
FIG. 10 A flowchart of a plural page-collectively turning process executed in a step in the page turning process shown in FIG. 3.

FIG. 10 is a flowchart of the plural page-collectively turning process executed in the step S310 in FIG. 3.

Referring to FIGS. 1, 2, and 10, there is given a description of the case where the fore edge 203 or 204 displayed in the book display region has been clicked similarly to the above. However, also when the left or right side of the top edge 205 or the bottom edge 206 has been clicked, the plural page-collectively turning process is executed in the same manner.

When the plural page-collectively turning process is started, the CPU 106 determines whether or not the turning direction is the forward direction (step S1001). In this example, if the cursor position acquired in the step S303 in FIG. 3 is on the left-side fore edge 203, the CPU 106 determines that the page turning direction is the backward direction, and if the cursor position is on the right-side fore edge 204, it determines that the page turning direction is the forward direction.

If the CPU 106 determines that the page turning direction is the forward direction (YES to S1001), the CPU 106 collectively turns a number of pages located on the right side, the number corresponding to the turning page count calculated in the step S307 in FIG. 3, and displays two pages consisting of the last page of the group of the number of pages and a page immediately following the last page in a double-page spread (step S1002). Then, the CPU 106 terminates the plural page-collectively turning process.

Figure 11:
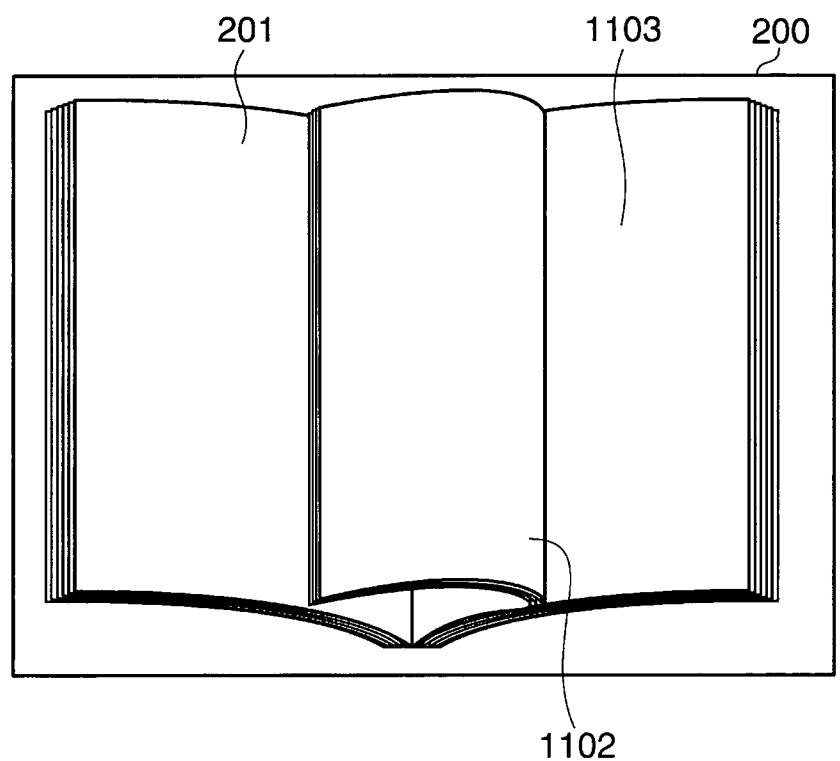
FIG. 11 A view of an example of a display showing a state in which pages on a right-page side are collectively turned in the plural page-collectively turning process described with reference to FIG. 10.

FIG. 11 is a view of an example of a display showing a state in which pages on the right side are collectively turned in the plural page-collectively turning process described with reference to FIG. 10.

As shown in FIG. 11, when the plural page-collectively turning process is performed, it is shown that a page group 1102 located on the right-page side are collectively turned and moved to the left-page side. More specifically, in the plural page-collectively turning process, as shown in FIG. 11, there are displayed a rectangular image having a predetermined width from a fore-edge side, which is extracted from an image representative of a reverse page which is the last page of the page group 1102 on the right-page side, an image representative of a thickness of the page group 1102 dependent on the number of pages thereof, a triangular image of a triangular portion formed by connecting a contact point between a turnover of the last page of the page group 1102 and the right page, a contact point between the last page and a gutter, and a bottom of the gutter, which is cut out from an image representative of the first page of the page group 1102, the whole of which was displayed most frontally before the present operation, and an image formed by extracting a portion of the left page which does not overlap an image of the page group 1102. After that, the last page of the page group 1102, which was on a reverse side of the page group 1102, is displayed on the left page side, and a page 1103 next to the page group 1102 is displayed on the right-page side, followed by terminating the plural page-collectively turning process. Although in the illustrated example, the page group 1102 is not accurately represented such that it is formed by a number of pages and respective associated reverse pages, corresponding to the turning page count, it is to be understood that the page group 1102 is displayed such that it has a thickness corresponding to the number of pages thereof. Further, although it has been described that a triangular image is extracted, the shape of the triangular image may include curves, not straight lines, or may be replaced by another polygon having a different shape. This makes it possible to represent a page turning operation with images in a manner more similar to an actual operation of turning pages of an actual book.

In this case, the contents of pages inside the page group 1102 being turned are not displayed during the turning process, but the contents of the last page of the page group 1102 being collectively turned are largely displayed. This makes it possible to reduce load for drawing images, thereby making it possible to shorten a time period required for drawing images. Further, it is possible to give the user a feeling that pages are collectively turned to a target page or its vicinity by the page turning.

Referring again to FIG. 10, if the CPU 106 determines in the step S1001 that the page turning direction is not the forward direction (NO to S1001), the CPU 106 collectively turns a number of pages on the left side, the number corresponding to the turning page count calculated in the step S307 in FIG. 3, and displays two pages consisting of the last page of the group of the number of pages and a page immediately preceding the last page in a double-page spread (step S1003). Then, the CPU 106 terminates the plural page-collectively turning process.

Although not shown, in the step S1003, the plural page-collectively turning process is performed in a direction opposite to the direction described with reference to FIG. 11.

Figure 12:
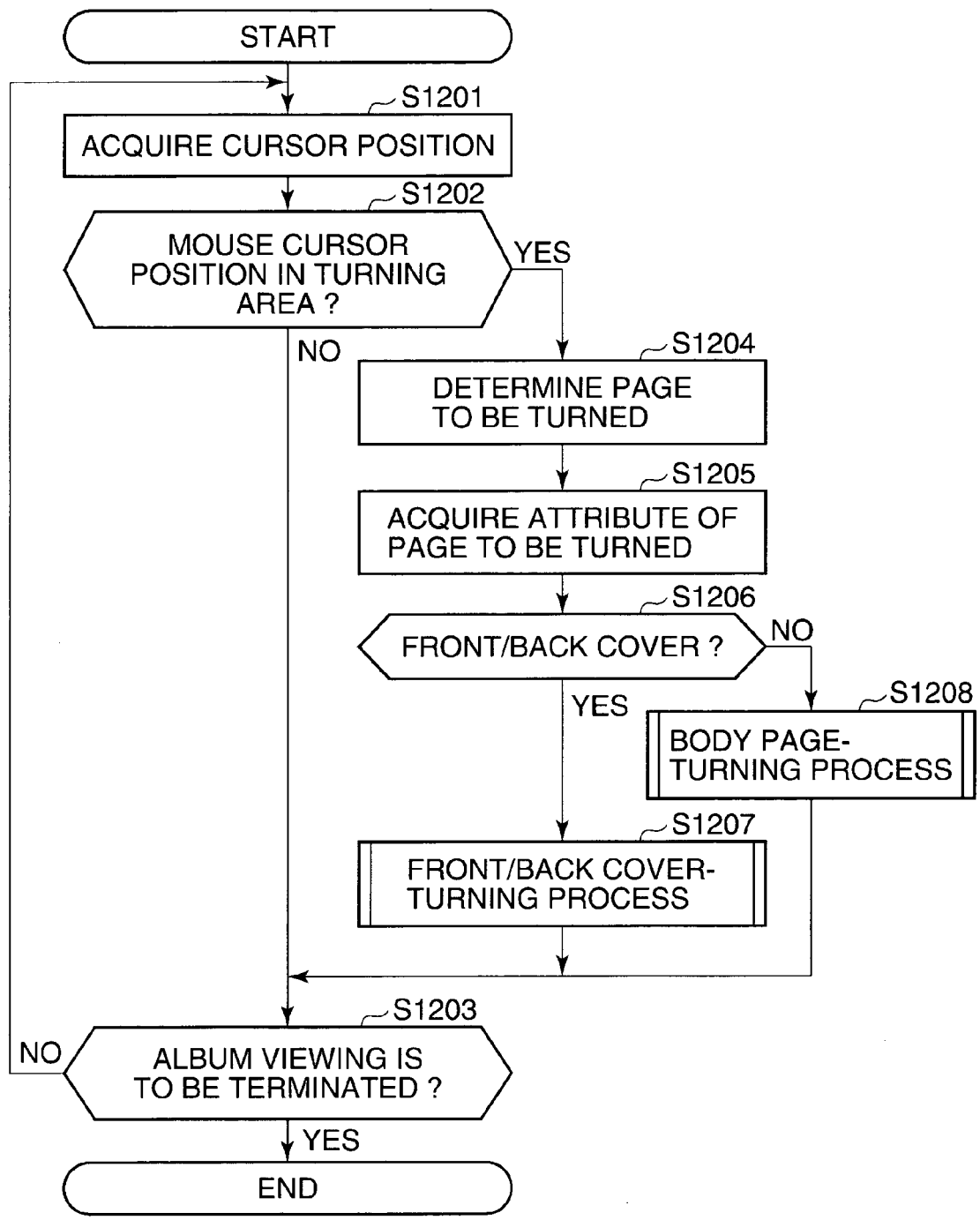
FIG. 12 A flowchart of a page turning process executed by an information processing apparatus including a display controller according to a second embodiment of the present invention.

Next, a description will be given of an information processing apparatus including a display controller according to a second embodiment of the present invention. The second embodiment has the same basic hardware and software configurations as those of the first embodiment, and detailed description thereof is omitted while denoting corresponding component elements by the same reference numerals. Hereafter, only different points of the second embodiment from the first embodiment will be described. FIG. 12 is a flowchart of a page turning process executed by the information processing apparatus 100 including the display controller according to the second embodiment. Although in the present embodiment, a description is given of viewing of an album as an electronic book, by way of example, a book, a magazine, and so forth, which are electronic books other than the album, can be viewed in the same manner.

Referring to FIGS. 1 and 12, as described hereinabove, the CPU 106 displays two pages forming the double-page spread of the electronic book and the book display region on the display 101. Then, the CPU 106 detects a cursor position operated by the pointing device 105, and acquires a cursor position (step S1201). Subsequently, the CPU 106 determines whether or not the cursor position is in any of turning areas, described hereinafter, of the book display region (hereinafter also referred to as the "album screen") (step S1202).

Figure 13:
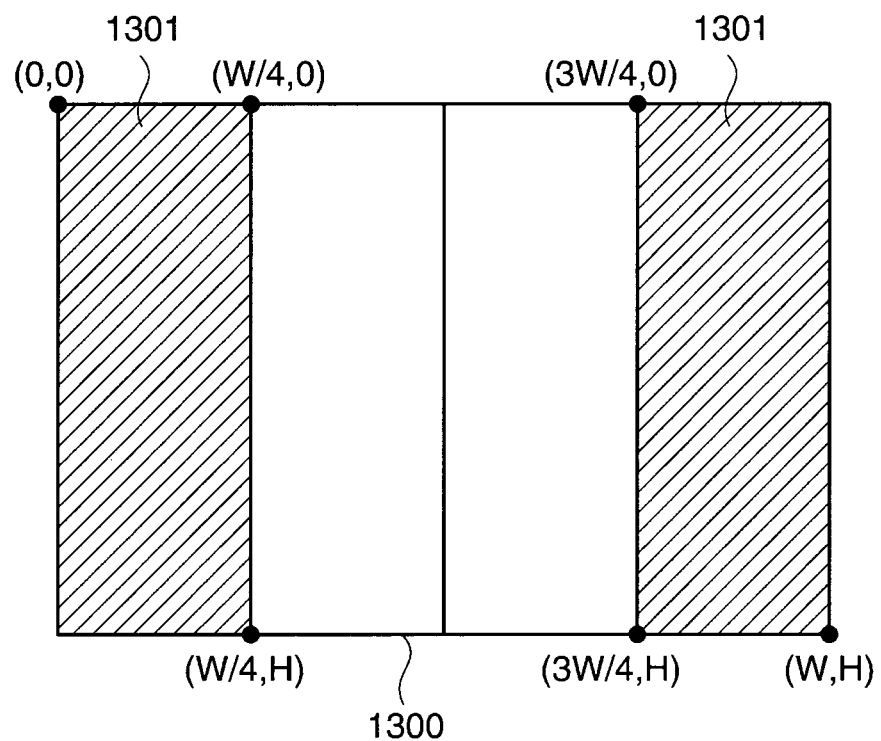
FIG. 13 A view of an example of turning areas on an album screen displayed on the display appearing in FIG. 1.

FIG. 13 is a view of an example of the turning areas, denoted by 1301, on the pages 201 and 202, displayed on the display 101 appearing in FIG. 1.

Referring to FIG. 13, when the cursor position is in the turning areas 1301, if a button of the pointing device 105 is pressed, the page turning is performed. The turning areas 1301 are designated in advance by a program.

In the illustrated example, the album screen 1300 is divided into four quarter portions in a horizontal direction, as viewed in FIG. 13, and the turning areas 1301 are set to respective areas of two quarter portions from opposite left and right ends of the album screen 1300. Therefore, in the illustrated example, there are defined the first and second turning areas 1301 on the right and left sides, respectively.

Now, the coordinates at the upper left corner of the album screen 1300 are set to (0, 0), and the horizontal length and the vertical length of the album screen 1300 are represented by W and H, respectively. Then, each turning area 1301 has a vertical coordinate of 0 to H, and at the same time a horizontal coordinate of 0 to W/4 or 3 W/4 to W.

Further, the area of the quarter portion from the right end, as viewed in FIG. 13, is an area where pages can be turned from the right to the left (first turning area 1301), and the area of the quarter portion from the left end is an area where pages can be turned from the left to the right (second turning area 1301).

Referring again to FIG. 12, if the CPU 106 determines that the cursor position is not in any of the turning areas 1301 (NO to S1202), the CPU 106 determines whether or not a request for terminating the viewing of the album has been received from the keyboard 104 or the like (step S1203). If the request for terminating the viewing of the album has been received (YES to S1203), the CPU 106 terminates the entire process for displaying the album.

On the other hand, if the request for terminating the viewing of the album has not been received (NO to S1203), the process returns to the step S1201, wherein the CPU 106 continues the page turning process.

If the CPU 106 determines that the cursor position is in one of the turning areas 1301 (YES to S1202), the CPU 106 determines a page to be turned (step S1204). Here, if the cursor position is in the area of the quarter portion from the right end, as viewed in FIG. 13 (i.e. the first turning area 1301), the CPU 106 determines that the right page is to be turned.

On the other hand, if the cursor position is in the area of the quarter portion from the left end, as viewed in FIG. 13 (i.e. the second turning area 1301), the CPU 106 determines that the left page is to be turned.

Subsequently, the CPU 106 acquire an attribute of the to-be-turned page from data of the electronic book (step S1205). Here, the attribute of a page is e.g. information indicating that the page is the front cover or the back cover of the album. Then, the CPU 106 determines whether or not the page attribute indicates the front cover or the back cover (step S1206).

If the CPU 106 determines that the page attribute indicates the front cover or the back cover (YES to S1206), the CPU 106 performs a front cover/back cover-turning process, described hereinafter (step S1207). Then, the process proceeds to the step S1203, wherein the CPU 106 determines whether or not the request for terminating the viewing of the album has been received.

On the other hand, if the CPU 106 determines that the page attribute does not indicate the front cover or the back cover (NO to S1206), the CPU 106 performs a body page-turning process, described hereinafter (step S1208). Then, the process proceeds to the step S1203.

Figure 14:
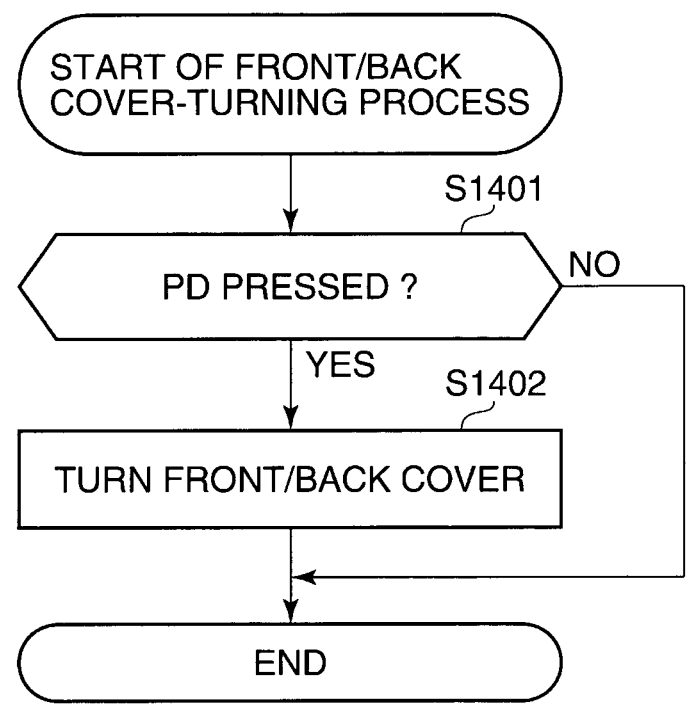
FIG. 14 A flowchart of a front cover/back cover-turning process executed in a step in the page turning process shown in FIG. 12.

FIG. 14 is a flowchart of the front cover/back cover-turning process executed in the step S1207 in FIG. 12.

Referring to FIGS. 1 and 14, when the front cover/back cover-turning process is started, the CPU 106 determines whether or not the button of the pointing device 105 has been pressed (step S1401). If the button of the pointing device 105 has been pressed (YES to S1401), the CPU 106 turns the front cover or the back cover, thereby displaying the album screen 1300 (step S1402). Then, the CPU 106 terminates the front cover/back cover-turning process.

On the other hand, if the button of the pointing device 105 has not been pressed (NO to S1401), the CPU 106 immediately terminates the front cover/back cover-turning process.

Figure 15:
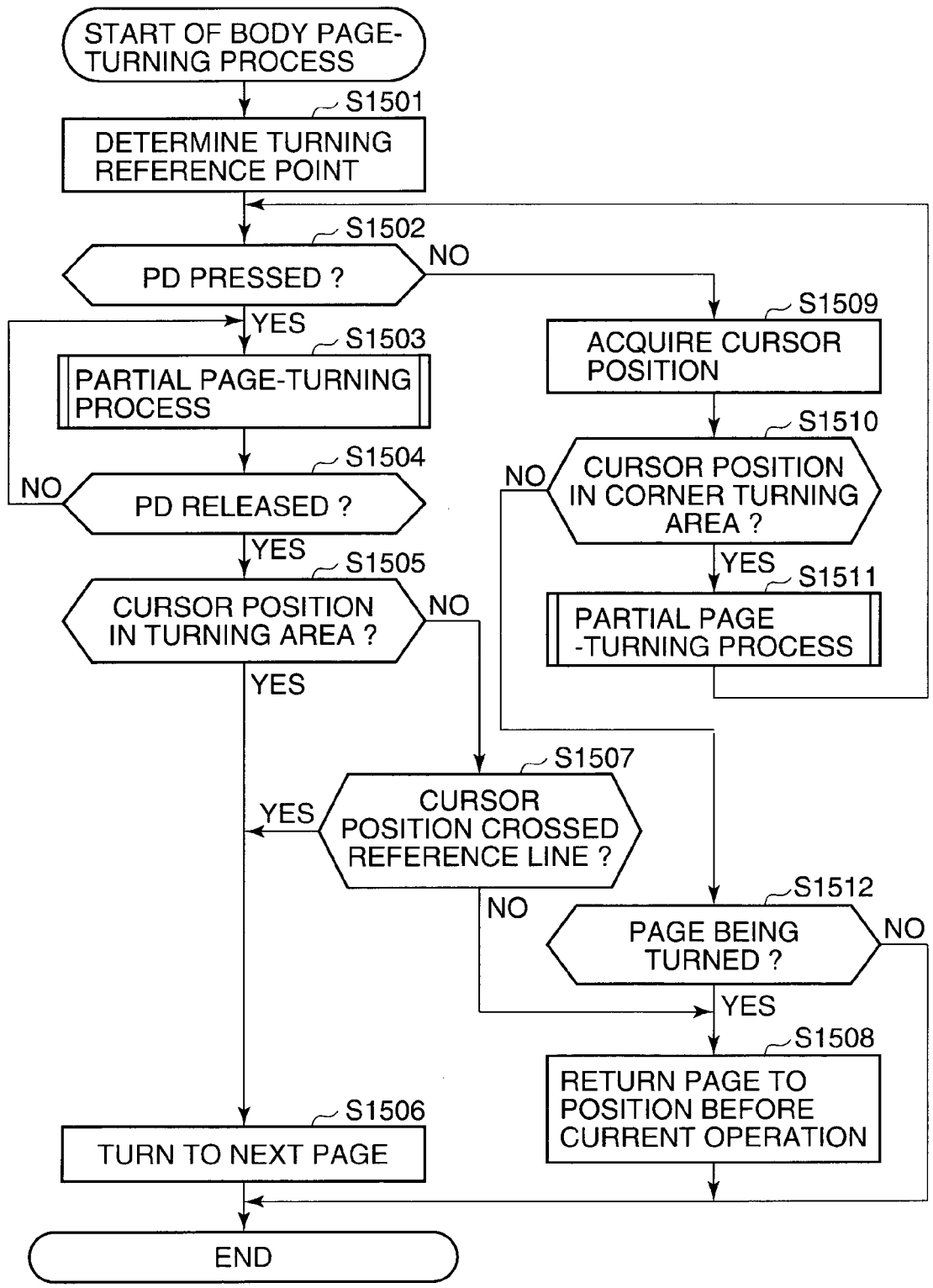
FIG. 15 A flowchart of a body page-turning process executed in a step in the page turning process shown in FIG. 12.

FIG. 15 is a flowchart of the body page-turning process executed in the step S1208 in FIG. 12.

Referring to FIGS. 1 and 15, when the body page-turning process is started, the CPU 106 determines a turning reference point (step S1501).

Figure 16:
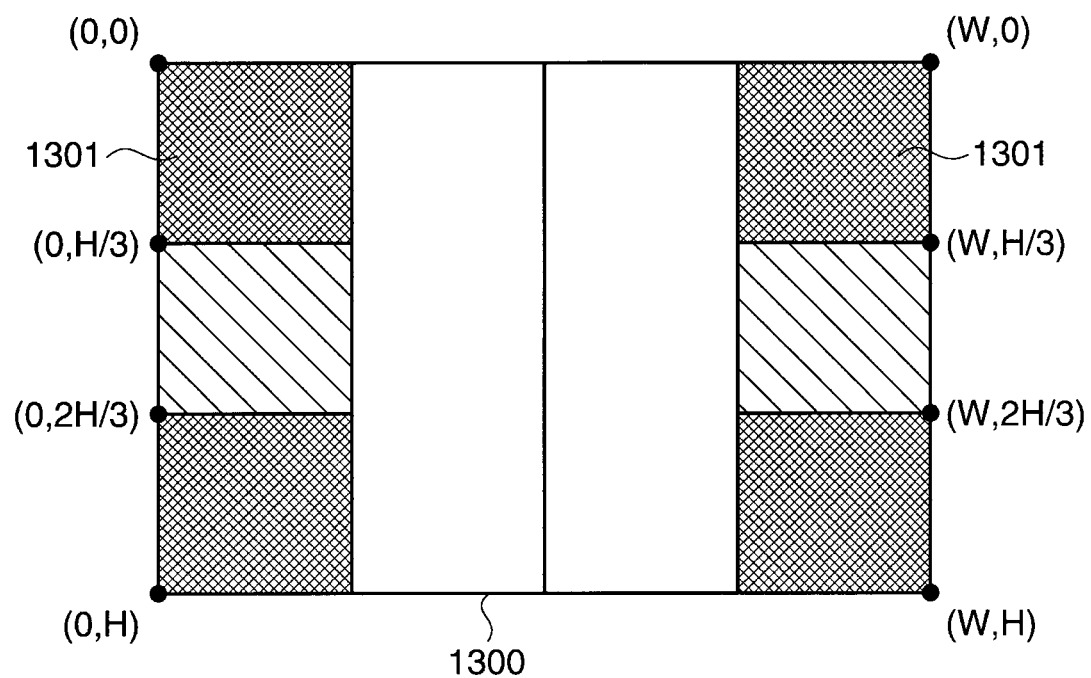
FIG. 16 A view useful in explaining an example of turning reference points on the album screen shown in FIG. 13.

FIG. 16 is a view useful in explaining an example of the turning reference point on the album screen 1300 shown in FIG. 13. The turning reference point is a point to be referred to in turning pages. A page is turned in a manner such that a point of a page, to which the turning reference point is set, is moved to the cursor position.

As shown in FIG. 16, in the illustrated example, each turning area 1301 is divided into three areas in the vertical direction, and when the cursor position is in an area of one-third portion extending from an upper end or a lower end of the turning area 1301, it is determined that the turning reference point is the point of a corner closest thereto.

Now, assuming the coordinates of the cursor position are represented by (X, Y), if the X coordinate is within a range of 0 to W/4, and at the same time the Y coordinate is within a range of 0 to H/3, the coordinates of the turning reference point are set to (0, 0).

Similarly, if the X coordinate is within a range of 0 to W/4, and at the same time the Y coordinate is within a range of 2 H/3 to H, the coordinates of the turning reference point are set to (0, H). Further, if the X coordinate is within a range of 3 W/4 to W, and at the same time the Y coordinate is within a range of 0 to H/3, the coordinates of the turning reference point are set to (W, 0). Further, if the X coordinate is from 3 W/4 to W, and at the same time the Y coordinate is within a range of 2 H/3 to H, the coordinates of the turning reference point are set to (W, H).

Further, when the cursor position is in the turning areas 1301 outside the above-described ranges, a point reached by horizontally shifting from the cursor position to a closer one of left and right ends of the turning areas 1301, as viewed in FIG. 16, is set to the turning reference point. For example, if the X coordinate is within a range of 0 to W/4, and at the same time the Y coordinate is larger than H/3 and smaller than 2 H/3, the coordinates of the turning reference point are set to (0, Y). Further, if the X coordinate is within a range of 3 W/4 to W, and at the same time the Y coordinate is larger than H/3 and smaller than 2 H/3, the coordinates of the turning reference point are set to (W, Y).

Referring again to FIG. 15, after the turning reference point is determined in the above-described manner, the CPU 106 determines whether or not the button of the pointing device 105 has been pressed (step S1502). If the button of the pointing device 105 has been pressed (YES to S1502), the CPU 106 executes a partial page-turning process for turning part of pages, described hereinafter (step S1503). Then, the CPU 106 determines whether or not the button of the pointing device 105 has been released (step S1504).

If the button of the pointing device 105 has not been released (NO to S1504), the process returns to the step S1503 to continue the process.

On the other hand, if the CPU 106 determines that the button of the pointing device 105 has been released, the CPU 106 determines whether or not the cursor position is in the one of the turning areas 1301 (step S1505). If the CPU 106 determines that the cursor position is in the one of the turning areas 1301 (YES to S1505), the CPU 106 turns the album to the next page (step S1506), and terminates the body page-turning process.

On the other hand, if the CPU 106 determines that the cursor position is not in the one of the turning areas 1301, the CPU 106 determines whether or not the cursor position has crossed a reference line, described hereinafter (step S1507).

Figure 17:
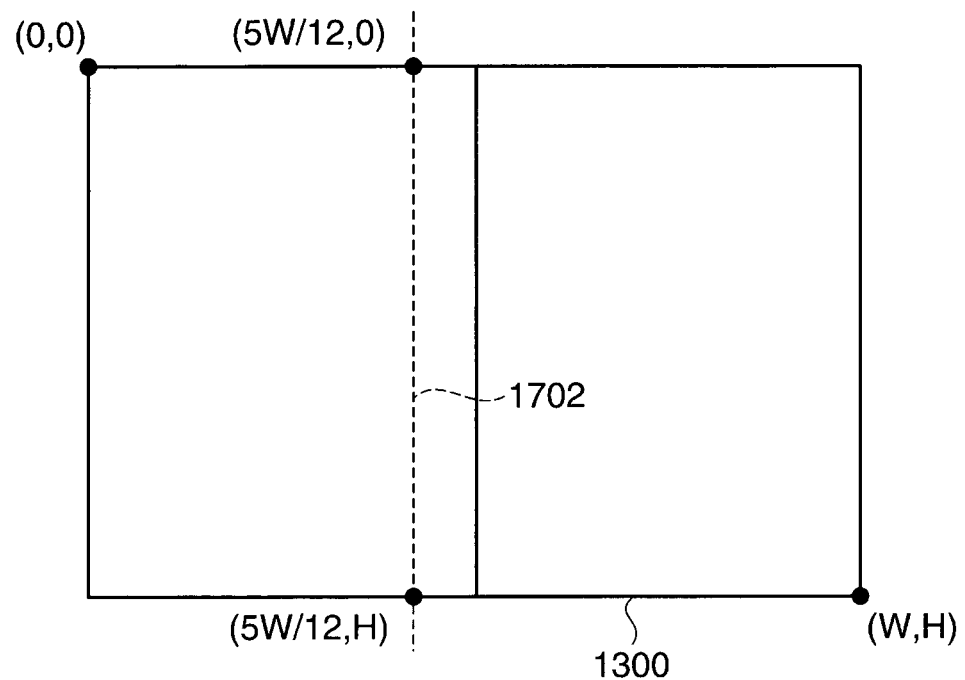
FIG. 17 A view which is useful in explaining an example of a reference line on the album screen shown in FIG. 13.

FIG. 17 is a view useful in explaining an example of the reference line 1702 on the album screen 1300 shown in FIG. 13. Here, the reference line 1702 is defined as a line which is referred to for determining whether or not the cursor position has crossed it when the button of the pointing device 105 has been released, so as to determine whether or not to turn a page.

In the example illustrated in FIG. 17, there is shown the reference line 1702 which is used when turning a right page. On a page adjacent to the page currently being turned, the reference line 1702 is set to a vertical line horizontally away from a center line of the album by one sixth of the width of the page. The CPU 106 determines that the cursor position has crossed the reference line 1702 if the X coordinate of the cursor position is not larger than 5 W/12.

On the other hand, if the X coordinate of the cursor position is larger than 5 W/12, the CPU 106 determines that the cursor position has not crossed the reference line 1702.

Referring again to FIG. 15, if the CPU 106 determines that the cursor position has crossed the reference line 1702 (YES to S1507), the process proceeds to the step S1506, wherein the CPU 106 turns the album to the next page, whereas if the CPU 106 determines that the cursor position has not crossed the reference line 1702 (NO to S1507), the CPU 106 returns the page being turned to its original position before the present page-turning operation (step S1508). Then, the CPU 106 terminates the body page-turning process.

If the CPU 106 determines in the step S1502 that the button of the pointing device 105 has not been pressed (NO to S1502), the CPU 106 acquires a cursor position (step S1509). Then, the CPU 106 determines whether or not the cursor position is in any of corner turning areas, described hereinafter (step S1510).

Figure 18:
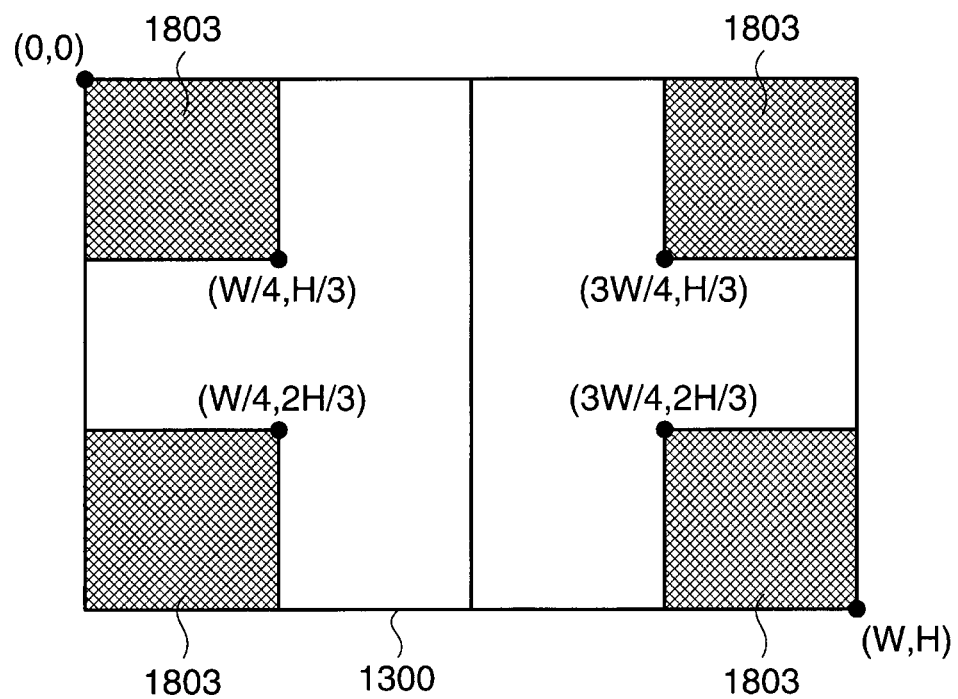
FIG. 18 A view which is useful in explaining an example of corner turning areas on the album screen shown in FIG. 13.

FIG. 18 is a view useful in explaining an example of the corner turning areas 1803 on the album screen 1300 shown in FIG. 13. In the present example, the corner turning areas 1803 is defined as such areas that if the cursor position is in any of them, the turning of a page is performed even when the button of the pointing device 105 has not been pressed. The corner turning areas 1803 are designated in advance by the program.

In the example illustrated in FIG. 18, each of the turning areas 1301 shown in FIG. 13 is further divided into three areas in the vertical direction, and the corner turning areas 1803 are set to respective areas of two one-third areas of each turning area 1301 extending from opposite top and bottom ends of the turning area 1301. In the case of the illustrated example, the corner turning areas 1803 are defined as four corner areas of the album screen 1300.

In the example illustrated in FIG. 18, each corner turning area 1803 is set to an area in which the vertical coordinates are within a range of 0 to H/3 or a range of 2 H/3 to H, and at the same time the horizontal coordinates are within a range of 0 to W/4 or within a range of 3 W/4 to W.

If the CPU 106 determines that the cursor position is in one of the corner turning areas 1803 (YES to S1510), the CPU 106 performs a partial page-turning process for turning part of a page (step S1511). Then, the CPU 106 returns to the step S1502 to continue the process.

On the other hand, if the CPU 106 determines that the cursor position is in none of the corner turning areas 1803 (NO to S1510), the CPU 106 determines whether or not a page is being turned (step S1512).

If a page is being turned (YES to S1512), the process proceeds to the step S1508, wherein the CPU 106 returns the page being turned to its original position before the page-turning operation, and terminates the body page-turning process. On the other hand, if no page is being turned (NO to S1512), the CPU 106 immediately terminates the body page-turning process.

Figure 19:
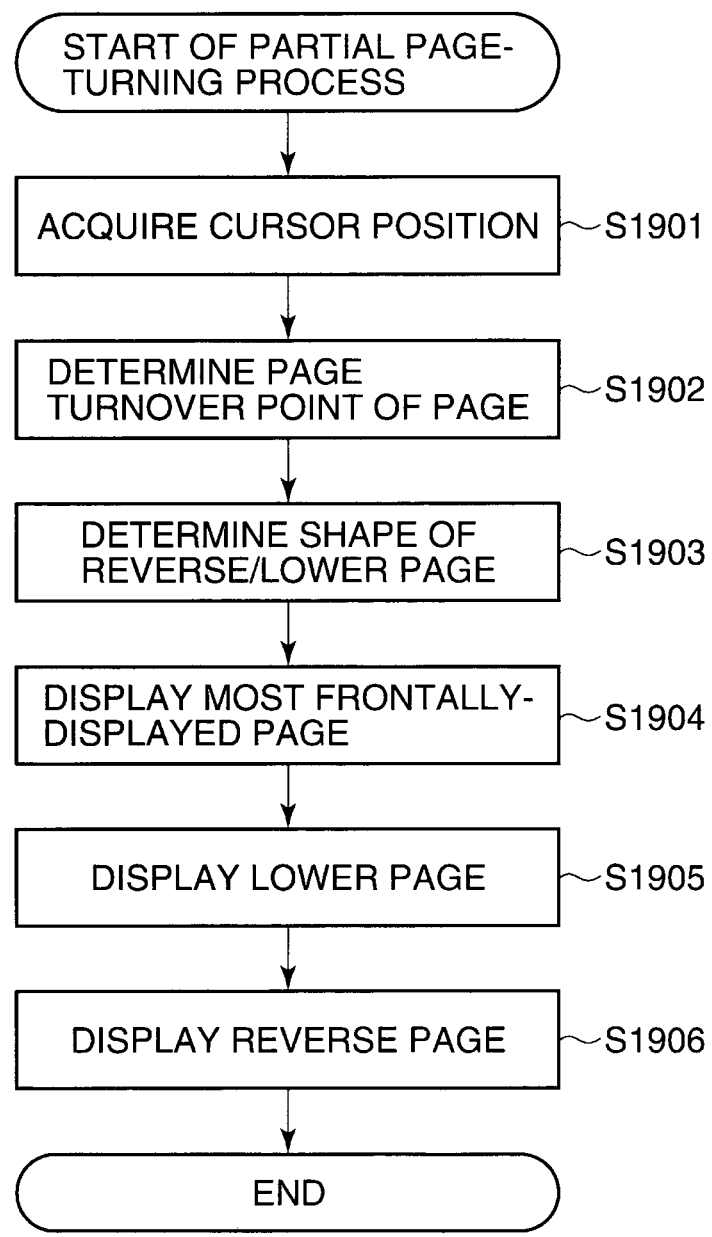
FIG. 19 A flowchart of a partial page-turning process executed in a step in the body page-turning process shown in FIG. 15.

FIG. 19 is a flowchart of the partial page-turning process executed in the steps S1503 and 1511 in FIG. 15. In the partial page-turning process, a page is partially turned.

Referring to FIGS. 1 and 19, when the partial page-turning process is started, the CPU 106 acquires a cursor position (step S1901). Next, the CPU 106 determines turnover points of a page, described hereinafter (step S1902).

Figure 20A:
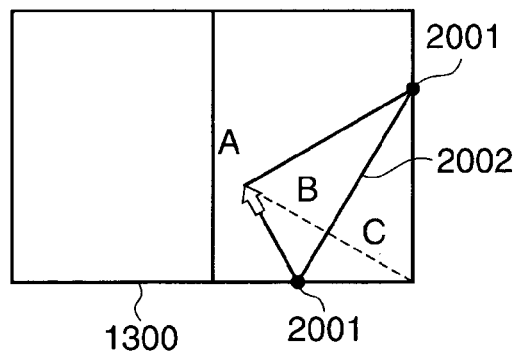
FIG. 20A A view of pages on the album screen shown in FIG. 13, which is useful in explaining examples of a page turning operation and turnover points, and shows a state in which the turnover points are on a right side and a lower side of the page.
Figure 20B:
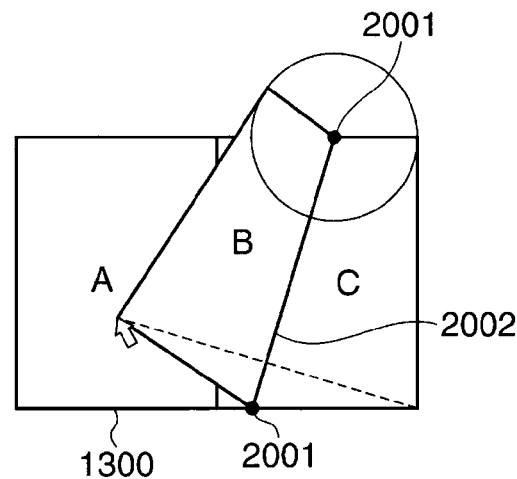
FIG. 20B A view of pages on the album screen shown in FIG. 13, which is useful in explaining examples of the page turning operation and turnover points, and shows a state in which the turnover points are on an upper side and the lower side of the page.
Figure 20C:
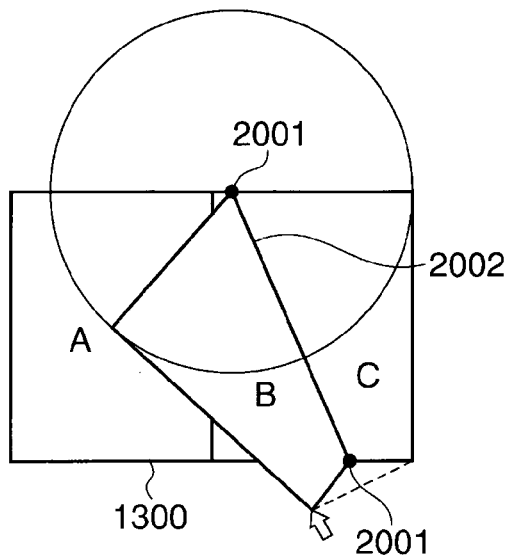
FIG. 20C A view of pages on the album screen shown in FIG. 13, which is useful in explaining examples of the page turning operation and turnover points, and shows a state in which the turnover points are on the upper side and the lower side of the page.
Figure 20D:
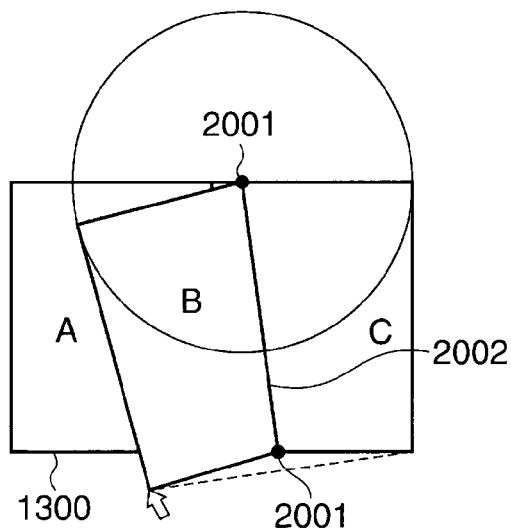
FIG. 20D A view of pages on the album screen shown in FIG. 13, which is useful in explaining examples of the page turning operation and turnover points, and shows a state in which the turnover points are on the upper side and the lower side of the page.

FIGS. 20A to 20D are views useful in explaining examples of page turning operations and turnover points 2001 of the page on the album screen 1300 shown in FIG. 13. FIG. 20A shows an example of a state where the turnover points 2001 are on a right side and a lower side of the page, respectively. FIG. 20B shows a first example of a state where the turnover points 2001 are on an upper side and the lower side of the page. FIG. 20C shows a second example of the state where the turnover points 2001 are on the upper side and the lower side of the page, and FIG. 20D shows a third example of the state where the turnover points 2001 are on the upper side and the lower side of the page. In the illustrated example, the turnover points 2001 are defined as points of opposite ends of a turnover line 2002 formed by turning a page.

As shown in FIGS. 20A to 20D, the turnover line 2002 is a perpendicular bisector of a line connecting the cursor position and the turning reference point, and the turnover points 2001 are intersections between the turnover line 2002 and the outer frame of the album.

Now, there sometimes occurs, depending on the cursor position, a physically impossible event that a length between the cursor position (to which the corner of a page corresponding to the turning reference point is moved and positioned) and one of the turnover points 2001 closer to the cursor position becomes larger than half of the horizontal length of each page of the album (horizontal page width). In such a case, the CPU 106 performs processing by modifying the coordinates of the cursor position according to the program, in a manner described hereafter.

Figure 21A:
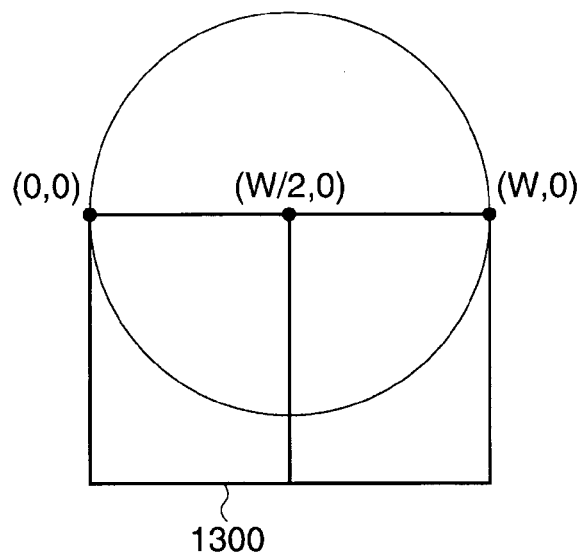
FIG. 21A A view of the album screen shown in FIG. 13, which is useful in explaining a first example of modification of coordinates of a cursor position during the page turning process thereon.
Figure 21B:
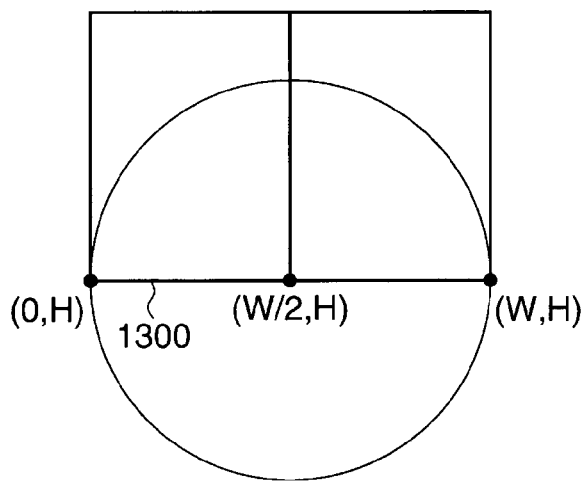
FIG. 21B A view of the album screen shown in FIG. 13, which is useful in explaining a second example of modification of coordinates of a cursor position during the page turning process thereon.
Figure 21C:
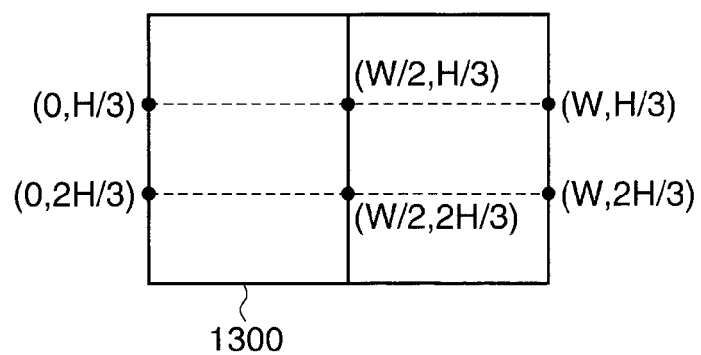
FIG. 21C A view of the album screen shown in FIG. 13, which is useful in explaining a third example of modification of coordinates of a cursor position during the page turning process thereon.

FIGS. 21A to 21C are views useful in explaining an example of modification of coordinates of the cursor position in the page turning process on the album screen 1300 shown in FIG. 13. FIG. 21A is a view useful in explaining a first example. FIG. 21B is a view useful in explaining a second example. FIG. 21C is a view useful in explaining a third example.

First, the modification described hereafter with reference to FIG. 21A is performed when the turning reference point is on an upper end (0, 0) or (W, 0) of the album screen 1300. When the cursor position is outside a circle with a radius of W/2 about a point (W/2, 0), the modification of the coordinates of the cursor position is performed such that the cursor position during the partial page-turning process is set to an intersection between a straight line connecting the cursor position and the point (W/2, 0) and the circumference of the circle.

The modification described hereinafter with reference to FIG. 21B is performed when the turning reference point is on a lower end (0, H) or (W, H) of the album screen 1300. When the cursor position is outside a circle with the radius of W/2 about a point (W/2, H), the modification of the coordinates of the cursor position is performed such that the cursor position during the partial page-turning process is set to an intersection between a straight line connecting the cursor position and the point (W/2, H) and the circumference of the circle.

The modification described hereinafter with reference to FIG. 21C is performed when the turning reference point is at a position other than in the above-described cases. More specifically, this modification is performed when the Y coordinate of the cursor position (X, Y) is larger than H/3 and smaller than 2 H/3.

When the cursor position is outside a circle with a radius of W/2 about a point (W/2, Y), the modification of the coordinates of the cursor position is performed such that the cursor position during the partial page-turning process is set to an intersection between a straight line connecting the cursor position and the point (W/2, Y) and the circumference of the circle.

Referring again to FIG. 19, after acquiring the turnover points 2001 of the page, as described hereinabove, the CPU 106 determines the respective shapes of a reverse page with respect to the most frontally-displayed page and a page next to the reverse page which is positioned immediately under the most frontally-displayed page (referred to as the "immediately lower page") (step S1903). In doing this, the display position and shape of the immediately lower page are determined using the coordinates of the turning reference point and the turnover points 2001. The shape of the reverse page is identical to that of the immediately lower page, and the display position of the reverse page is in a symmetric relation with the display position of the immediately lower page. These shapes may be formed only by straight lines or curves, and alternatively, they may include straight lines and curves. Anyway, shapes closer to the appearance of an actual book during the page-turning operation are employed.

Subsequently, the CPU 106 displays the most frontally-displayed pages (step S1904). Then, the CPU 106 extracts an image having the shape determined in the step S1903 from the image of the immediately lower page and displays the extracted image in the display position thereof (step S1905). Next, the CPU 106 extracts an image having the shape determined in the step S1903 from the image of the reverse page, and displays the extracted image in the display position thereof (step S1906). Then, the CPU 106 terminates the partial page-turning process.

As a consequence, in FIGS. 20A to 20D, assuming that the most frontally-displayed pages are represented by A, the reverse page is represented by B, and the immediately lower page is represented by C, the reverse page B and the immediately lower page C are determined depending on the coordinates of the turning reference point and the turnover points 2001 (and the turnover line 2002), as described hereinabove. By displaying the most frontally-displayed pages A, the lower page C, and the reverse page B in the mentioned order on the album screen 1300, it is possible to display the album on the display as if the user were turning an actual book.

As described heretofore, in the information processing apparatus 100 including the display controller according to the above-described embodiments, it is possible for the user to turn the pages of an electronic book (including an album and the like as well) by intuitive operations, thereby making it possible to enhance userfriendliness.

As is clear from the above description, in the above-described embodiments, the electronic book is displayed on the display screen in a double-page spread through the display processing by the CPU 106. Further, in the above-described embodiments, the CPU 106 executes the display processing according to the above-described processes. Therefore, the CPU 106 serves as a detection unit, an extraction unit, a drawing unit, and a calculation unit.

Although the present invention has been described based on the embodiments, the present invention is not limited to the above-described embodiments, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 101 display
102 VRAM
104 keyboard
105 pointing device

106 CPU
107 ROM
108 RAM
109 HDD
200 display region
201, 202, 503 page
502 reverse page
203, 204 fore edge
205 top edge
206 bottom edge
207 cursor
1300 album screen
1301 turning area
1803 corner turning area
2001 turnover point
2002 turnover line

The invention claimed is:

1. An information processing apparatus configured to execute display control of an electronic book having a plurality of pages, the information processing apparatus comprising:
 a display unit configured to display double pages of the electronic book in a double-page spread state together with first and second fore edge areas of the electronic book while displaying a cursor capable of moving according to a user instruction, the first fore edge area representing a thickness corresponding to a first number of pages from a front cover of the electronic book to the displayed double pages, and the second fore edge area representing a thickness corresponding to a second number of pages from the displayed double pages to a back cover of the electronic book;
 a detection unit configured to detect a cursor position when the cursor overlaps one of the first and second fore edge areas displayed by said display unit;
 a calculating unit configured to calculate a number of pages from the displayed double pages to a page corresponding to the detected cursor position;
 a comparing unit configured to compare the calculated number of pages with a predetermined number; and
 a page turning unit configured to perform a plural page-continuously-turning process in which a plurality of pages are sequentially and continuously turned if the calculated number of pages is not larger than the predetermined number, as compared by the comparing unit, and a plural page-collectively-turning process in which a plurality of pages are collectively turned if the calculated number of pages is larger than the predetermined number, as compared by the comparing unit.

2. The display controller according to claim 1, wherein said page turning unit is configured to perform a single-page-turning process if said detection unit detects the cursor position when the cursor overlaps a page display region indicative of an area showing only pages of the book display region, wherein the single-page-turning process is a process for turning a single page.

3. The display controller according to claim 1, wherein the plural page-continuously-turning process and the plural page-collectively-turning process are page-turning processes, and wherein said page turning unit is configured to perform either or both of the page-turning processes based on a page turning direction, which is a forward direction or a backward direction, in accordance with the detected cursor position.

4. The display controller according to claim 1, further comprising a turning reference point setting unit configured to set a turning reference point in accordance with the detected cursor position,
 wherein said page turning unit is configured to perform the plural page-continuously-turning process, the plural page-collectively-turning process, or both in a manner such that a point of a page, to which the turning reference point is set, is moved to the position of the cursor.

5. The display controller according to claim 1, wherein the plural page-continuously-turning process and the plural page-collectively-turning process are page-turning processes, and wherein said page turning unit is configured to further determine whether or not the cursor has crossed a reference line preliminarily set away from a center line of a book display region, and said page turning unit is configured to perform either or both of the page-turning processes when it is determined that the cursor has crossed the reference line.

6. The display controller according to claim 1,
 wherein corner turning areas are defined as four corner areas of a book display region,
 wherein the detection unit is configured to detect the cursor position when the cursor overlaps one of the four corner areas, and
 wherein said page turning unit is configured to perform a partial-page-turning process in which a page displayed in the book display region is partially turned when it is determined that the detected cursor position overlaps one of the four corner areas.

7. A method executed by an information processing apparatus configured to execute display control of an electronic book having a plurality of pages, the method comprising:
 displaying double pages of the electronic book in a double-page spread state together with first and second fore edge areas of the electronic book while displaying a cursor capable of moving according to a user instruction, the first fore edge area representing a thickness corresponding to a first number of pages from a front cover of the electronic book to the displayed double pages, and the second fore edge area representing a thickness corresponding to a second number of pages from the displayed double pages to a back cover of the electronic book;
 detecting a cursor position when the cursor overlaps one of the first and second fore edge areas displayed in the displaying;
 calculating a number of pages from the displayed double pages to a page corresponding to the detected cursor position;
 comparing the calculated number of pages with a predetermined number; and
 performing a plural page-continuously-turning process in which a plurality of pages are sequentially and continuously turned if the calculated number of pages is not larger than the predetermined number, as compared in the comparing, and a plural page-collectively-turning process in which a plurality of pages are collectively turned if the calculated number of pages is larger than the predetermined number, as compared in the comparing.

8. A non-transitory computer-readable storage medium storing a computer-executable program configured to control an information processing apparatus configured to execute display control of an electronic book having a plurality of pages, the program comprising:
 display instructions configured to display double pages of the electronic book in a double-page spread state together with first and second fore edge areas of the electronic book while displaying a cursor capable of moving according to a user instruction, the first fore edge area representing a thickness corresponding to a first number of pages from a front cover of the electronic book to the displayed double pages, and the second fore edge area representing a thickness corresponding to a second number of pages from the displayed double pages to a back cover of the electronic book;

detection unit configured to detect a cursor position when the cursor overlaps one of the first and second fore edge areas displayed according to said display instructions;

calculating instructions configured to calculate a number of pages from the displayed double pages to a page corresponding to the detected cursor position;

comparing instructions configured to compare the calculated number of pages with a predetermined number; and page turning instructions configured to perform a plural page-continuously-turning process in which a plurality of pages are sequentially and continuously turned if the calculated number of pages is not larger than the predetermined number, as compared according to the comparing instructions, and a plural page-collectively-turning process in which a plurality of pages are collectively turned if the calculated number of pages is larger than the predetermined number, as compared according to the comparing instructions.

\* \* \* \* \*